United States Patent [19]

West et al.

[11] 4,106,581
[45] Aug. 15, 1978

[54] VEHICLE UTILIZING CRYOGENIC FUEL

[76] Inventors: Curtis W. West, 7227 Drowsy Pine, Houston, Tex. 77092; Larry E. Lee, 9027 Eldora, Houston, Tex. 77080; Aubrey O. Norris, P.O. Box 264, Pinehurst, Tex. 77362

[21] Appl. No.: 664,110

[22] Filed: Mar. 5, 1976

[51] Int. Cl.$^2$ .............................................. B60K 3/02
[52] U.S. Cl. .................................. 180/54 B; 60/651; 60/671; 91/187
[58] Field of Search ................ 180/54 B, 66 B, 66 A, 180/66 C, 67; 91/187; 60/369, 370, 407, 472, 671, 651, 418, 413

[56] References Cited

U.S. PATENT DOCUMENTS

| | | | |
|---|---|---|---|
| 672,256 | 4/1901 | Bobrick | 60/641 |
| 805,726 | 11/1905 | Hove | 91/187 |
| 901,493 | 10/1908 | Stephens | 180/66 B |
| 1,383,661 | 7/1921 | Raspotnik | 180/66 B |
| 1,579,296 | 4/1926 | Francois | 91/187 |
| 1,904,611 | 4/1933 | Boyette | 180/66 B |
| 1,963,091 | 6/1934 | Jenkins | 180/66 B |
| 2,951,471 | 9/1960 | Hill | 91/187 |
| 3,413,805 | 12/1968 | Heller et al. | 60/651 |
| 3,681,609 | 8/1972 | Bobse et al. | 180/54 B |
| 3,830,326 | 8/1974 | Hortung | 180/54 B |

*Primary Examiner*—David M. Mitchell
*Attorney, Agent, or Firm*—Donald Gunn

[57] ABSTRACT

A cryogenic fuel powered vehicle is disclosed. A cryogenic fuel, such as liquid nitrogen or other liquified gases, is stored in a container at a selected pressure. The apparatus includes a suitable container, a heat exchanger for adding heat to the cryogenic liquid to cause it to expand and convert to gas, a valving apparatus which controls the rate of flow of the expanded gas, and a power plant formed of at least one cylinder having a double acting piston. The double acting piston has inlet and exhaust valves connected to it. The relative timing of the opening of the intake valve is related to the movement of the piston by a cam and cam follower to reduce the gas pressure in the piston at the end of each stroke practically to zero to eliminate waste of the cryogenic fuel. The valve system is adjustable to accommodate depletion of the cryogenic storage container.

15 Claims, 7 Drawing Figures

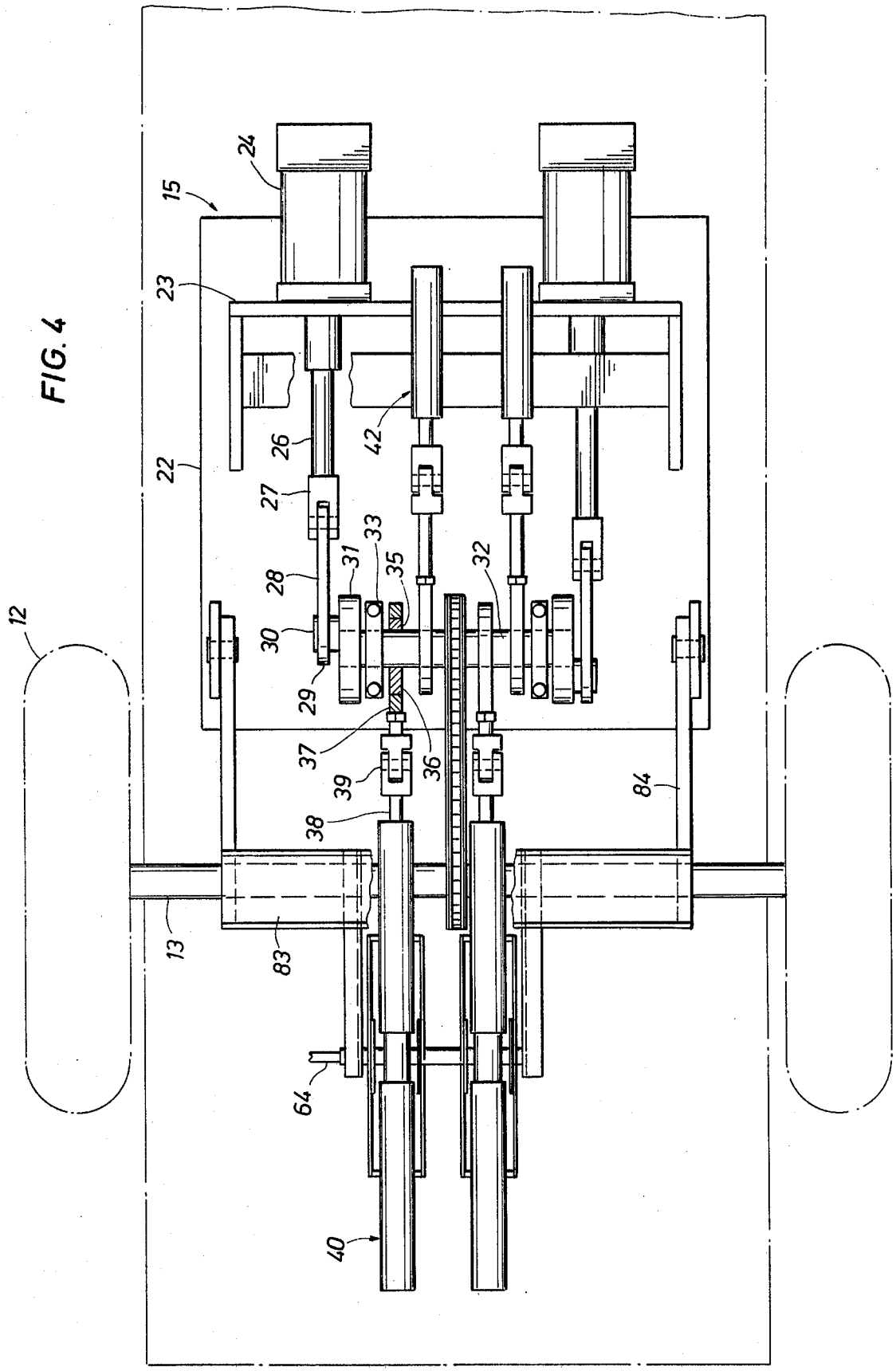

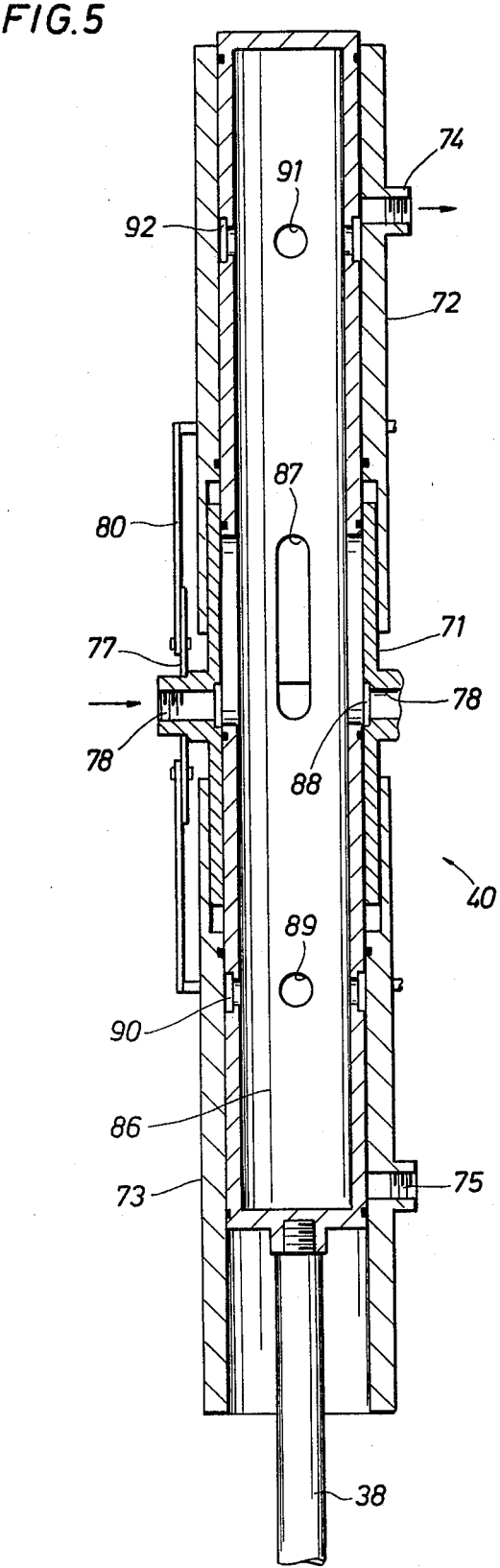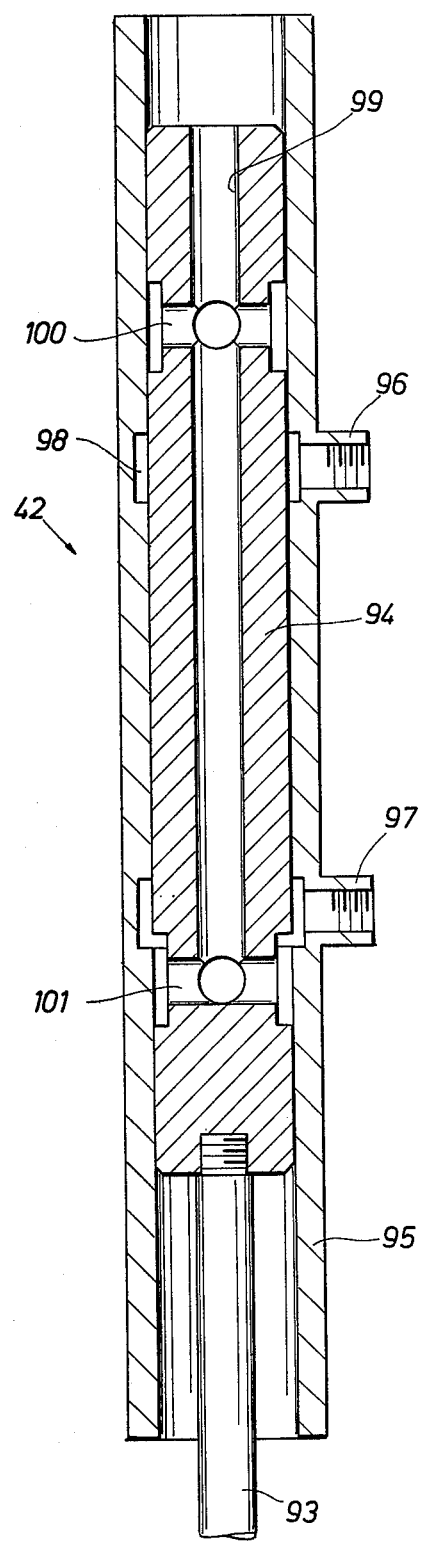

VEHICLE UTILIZING CRYOGENIC FUEL

BACKGROUND OF THE INVENTION

There are many medical and industrial uses for oxygen and the noble gases recovered from the atmosphere. While these gases are of great interest and have a substantial commercial value, nitrogen comprises a greater portion of the atmosphere. Nitrogen is substantially inert. Accordingly, it is most advantageous as a non-polluting fuel which is recovered in the same process normally used to obtain liquid oxygen and other gases from the atmosphere. Other constituents in liquid air include carbon dioxide, neon, argon, and zenon. As a consequence, it could be a by-product of most oxygen manufacturing plants and many plants are dedicated to making nitrogen.

The readily available abundant supplies of nitrogen make it uniquely adaptable as a feed stock for specialty equipment such as people and freight movers. Such equipment can be operated in hazardous areas where electrical or hydrocarbon powered plants are too dangerous. One type of specialty equipment is special vehicles. The present disclosure is directed to a vehicular power plant though not confined to vehicles. The power plant is adaptable for all types of vehicles. Because there is presently no distribution system comparable to service stations which dispense gasoline, it is conjectured that passenger automobiles will initially utilize the power plant herein disclosed only in small quantities. However, this power plant is uniquely adapted for dedicated fleets which operate in the near vicinity of a cryogenic liquid storage facility. As an example, the power plant herein disclosed is easily adapted for vehicles operating at a given location. An industrial example is the use of the power plant herein disclosed in fork lifts, delivery carts, and the like at a large plant. Another example is the use of cryogenically fueled busses traveling a fixed route and returning to a storage yard daily. Many other examples can be suggested. In any case, they suggest a setting where the present apparatus is easily used with a single fueling facility. At a typical golf course service yard, a large cryogenic storage tank can be installed at the club house, and the golf carts can be easily refueled after each round of golf. The present invention would be advantageous in that it is substantially quieter than an internal combustion engine. It also provides a totally non-polluting engine requiring little or no hydrocarbons even as lubricants and none as a fuel.

SUMMARY OF THE DISCLOSURE

This apparatus is summarized as a cryogenically fueled power plant particularly adapted for vehicles. The apparatus incorporates a pressurized cryogenic fuel storage tank. It is preferably pressure regulated. A line is connected to the tank and draws off liquid from the tank at regulated pressure. The liquid is introduced to a radiator where it absorbs heat and expands. The radiator is connected through an outlet line to a valve which controls the rate of feed from the source to the engine. The engine is formed of at least one cylinder having a double acting piston therein connected by a rod to a crank shaft. The apparatus incorporates an intake valve and exhaust valve for each end of the piston in a double acting engine. The intake valve supplies gas under pressure from the source to two lines, one being connected to one end of the cylinder and the other connected to the opposite end. In addition, an outlet valve is connected to each end of the cylinder and is switched to exhaust the cylinder synchronized with the introduction of gas under pressure by the inlet valve. The valves are timed in their operation by cam lobes on the crank shaft. In addition, the inlet valve is preferably mounted so that it may be moved, manually or automatically, to a different angular location relative to the crank shaft to thereby vary valve opening and closing relative to the crank shaft.

DESCRIPTION OF THE DRAWINGS

FIG. 4 is a plan view of a two cylinder engine incorporating the present disclosure which engine is mounted with the crank shaft parallel to an axle for providing power to it;

FIG. 5 is a sectional view through the intake valve which provides pressurized gas to the double acting piston;

FIG. 6 is a sectional view through the exhaust valve showing internal details of construction.

DESCRIPTION OF THE PREFERRED EMBODIMENT

Figure 1:
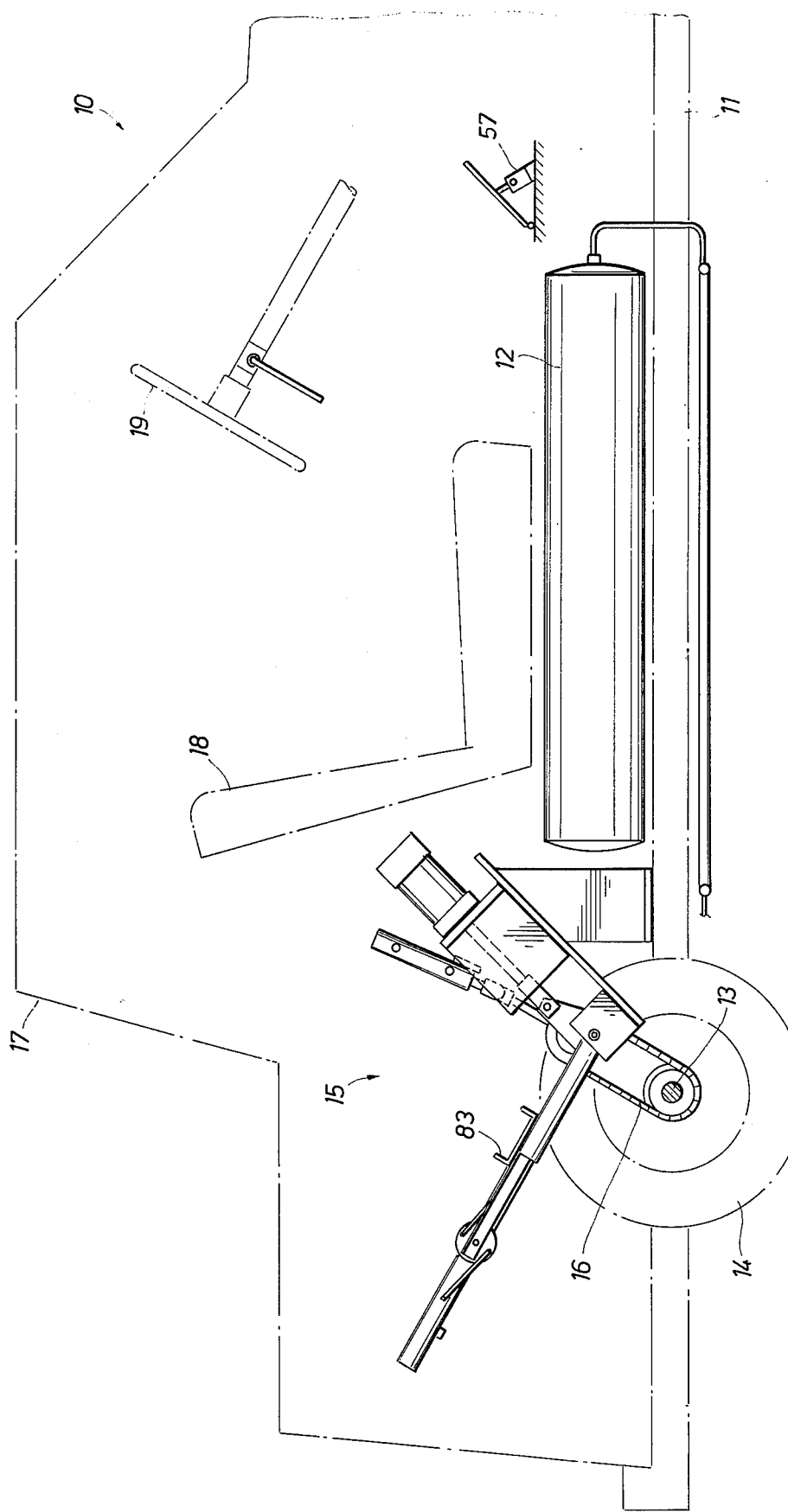
FIG. 1 is a side view showing the power plant of the present invention installed in a vehicle, the vehicle representing supporting equipment and illustrated schematically.

Attention is first directed to FIG. 1 of the drawings where a cryogenically powered vehicle is identified by the numeral 10. The vehicle may be any type of vehicle including a passenger vehicle or a vehicle for moving cargo. It is represented somewhat schematically as a passenger vehicle but it will be understood that this disclosure is not so limited. Rather, this disclosure is directed to a power source for typical vehicles including cargo carrying vehicles such as fork lifts, tractors, busses, recreational vehicles such as boats, all terrain vehicles, golf carts, and the like. With this in view, the vehicle 10 shown in FIG. 1 incorporates a frame 11 which supports a cryogenic storage tank 12. The vehicle 10 is supported on the ground by appropriate tired wheels 14. They are mounted on a suitable axle 13. The power plant is identified generally by the numeral 15 and is connected to the axle 13 by means of a drive chain 16. A v-belt, gear, or shaft drive will suffice. The vehicle 10 includes a closed body 17, a seat for driver and passengers at 18, and steering apparatus 19. In addition, it preferably includes a valve control 57 which serves as an accelerator. A gear system is optional.

Figure 2:
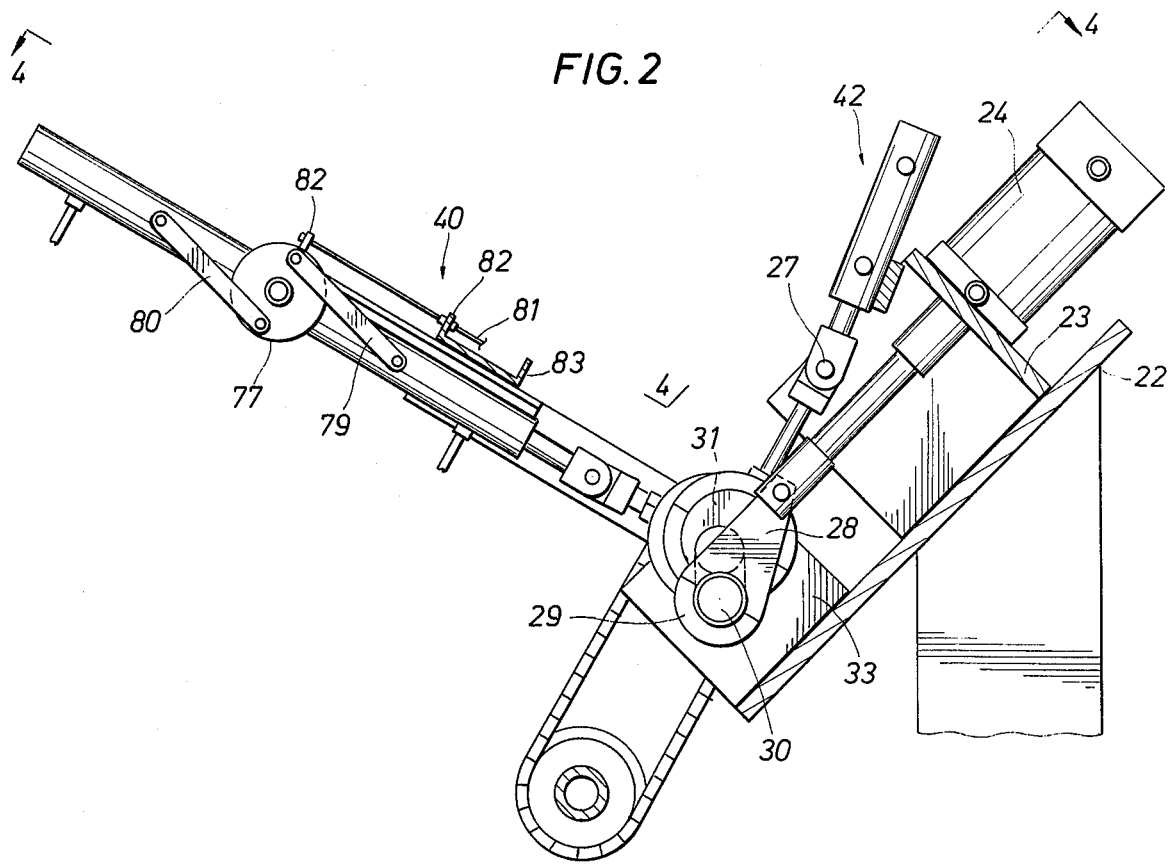
FIG. 2 is a side view of the power plant of the present invention showing the arrangement of the cylinder and piston rod which extend to the crank shaft, a fixed outlet valve, and a movable inlet valve, both valves being timed by cam follower rods extending to the crank shaft.

For a better understanding of the apparatus, attention is next directed to FIGS. 2 and 4 of the drawings. There, the views depict a typical small power plant capable of providing adequate power for a passenger vehicle or the like. The apparatus incorporates a base plate 22 which has a perpendicular upstanding mounting bracket 23. The bracket 23 is reinforced at appropriate locations by angle braces. It positions and supports a cylinder 24. One cylinder will be described while the remaining duplicate cylinders do not require any description except to note the timed sequence of operation of multiple cylinders.

The cylinder encloses a piston 25 (see FIG. 7) which is appended to the end of a piston rod 26. The piston rod is shown in FIG. 4 to incorporate a clevis 27 at its end. The clevis communicates power to a pivoted rod 28. The rod 28 terminates in an eyelet 29 which encircles an eccentric pin 30 protruding from a throw 31 of the crank shaft 32. The crank shaft 32 is held in position by fixed pillow blocks 33 on the base plate 22. The pillow blocks are mounted on the base plate 22. The throw 31 positions the eccentric pin 30 so that reciprocating motion of the piston rod 26 is converted into rotation of the crank shaft 32.

Continuing with the description of the power plant, the engine 15 incorporates an eccentric disc 35 mounted integrally on the crank shaft. Several discs function as cam lobes. Each cylinder incorporates dual intake valves and dual exhaust valves (the engine is double acting). Accordingly, the apparatus includes two lobes for each cylinder with each lobe operating two valves. In the embodiment shown, there are two cylinders and hence four lobes are required. The lengthwise arrangement of the lobes on the crank shaft is not critical; however, the angular position of each lobe must be arranged so that the intake and exhaust valves are opened and closed in timed sequence. Correct timing requires opening and closure of valves to deliver the cryogenic gas to the cylinder to provide timed power strokes.

Continuing with FIG. 4, the lobe 35 is a circular disc which is eccentrically mounted relative to the crank shaft 32. It is snuggly encircled by a ring follower 36. The ring follower is affixed to the end of a shaft 37. The shaft 37 serves as a cam follower. It communicates the oscillatory motion of the eccentric disc 35 to a valve control rod 38. The rods 37 and 38 connect together at a clevis assembly 39 and they are pin connected to permit pivotal movement of the rods relative to one another. The valve control rod 38 extends to a valve mechanism 40 which serves as the intake valve (actually two valves for one cylinder). In similar manner, an eccentric affixed on the shaft 32 communicates timed oscillatory movement to an exhaust valve 42. The valves 40 and 42 work in conjunction with a single cylinder as will be described. They are provided with timed movement from the crank shaft. As will be understood, a separate cam shaft can be incorporated although it is not necessary. It is normally necessary in four stroke internal combustion engines to time the opening and closing of valves at a rate one half of the rotational speed of the crank shaft. In this apparatus, the cam shaft and crank shaft, so to speak, rotate at the same speed and hence the two can be combined into one. If convenient a separate crank shaft can be used.

Figure 7:
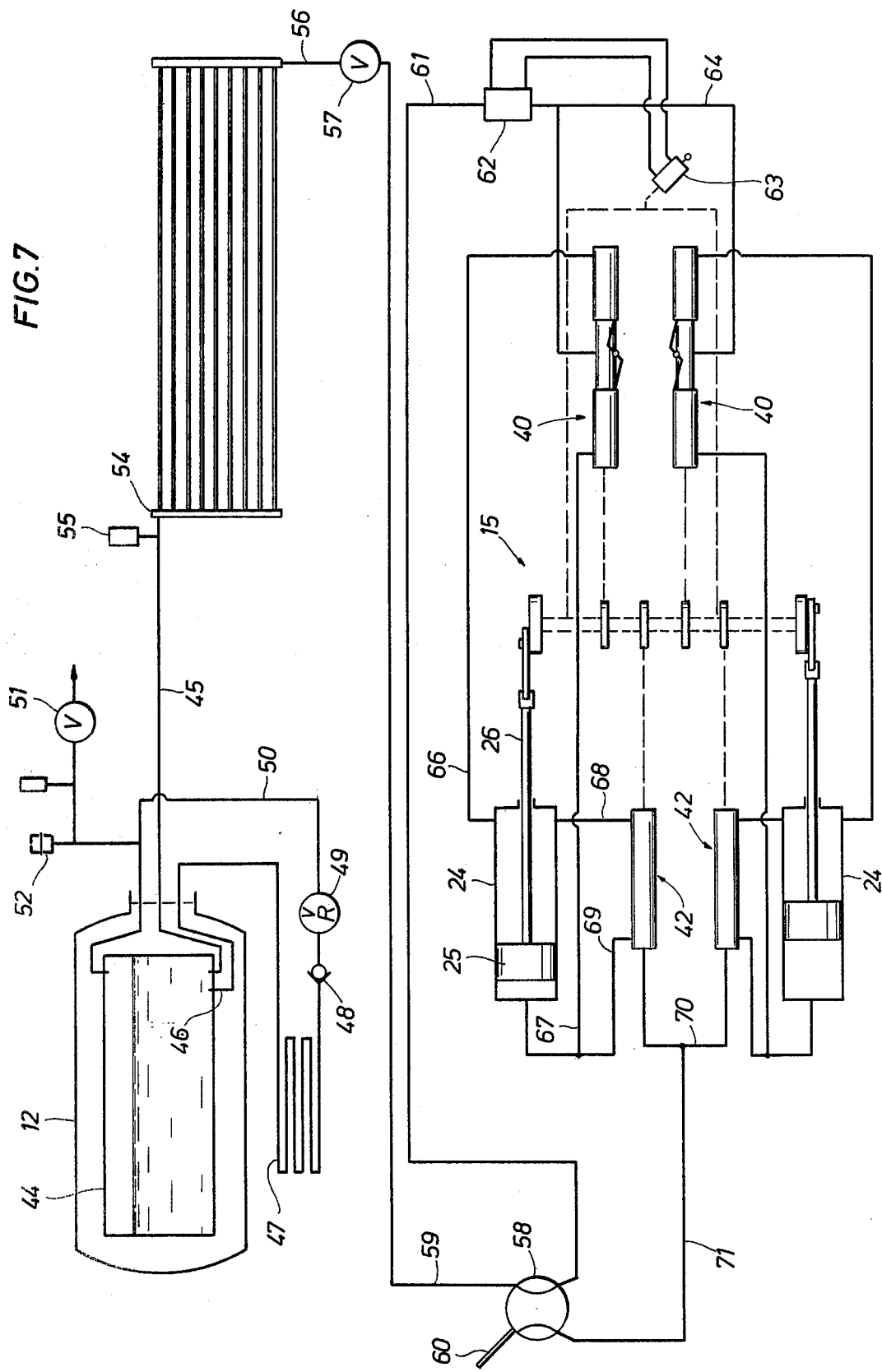
FIG. 7 is a schematic system diagram showing the entire apparatus including the fuel supply and the path of flow thereof.

Attention is next directed to the schematic system of FIG. 7. It will be described so that the timed function of the valves 40 and 42 will be understood. Thereafter, the valves themselves will be described. FIG. 7 thus shows the storage tank 12 which is a multiwalled insulated vessel for storage of liquid cryogenic fuel. A typical fuel is liquid nitrogen. It does not have to be purified and may include other liquified gases. In any case, the tank includes an internal compartment 44. A feed line 45 is connected to the tank 44. It will be observed that it connects at the bottom. This assures that liquid is forced into the line 45. A bleed line 46 is connected to the bottom of the tank to draw off liquid. The line 46 is connected to a small heat exchanger 47. The heat exchanger converts the liquid to gas which flows out through a check valve 48 and then through a pressure regulator valve 49. The valve 49 is connected to a line 50 which is returned to the tank 44. The line 50 connects at the top of the tank which is a vapor space. It returns vapor or gas to that part of the tank. This regulates the pressure in the tank as a result of the operation of the check valve 48 and the pressure regulation valve 49. In the event that pressure drops, the pressure regulator valve 49 opens to introduce more gas into the top of the tank in the vapor space.

It is possible that pressure might become too great in the tank as will occur on a very warm day. To avoid the danger of explosion, the line 50 is connected to a rupture disc 52 and relief valve 51 which vents to atmosphere. The venting of surplus gas to atmosphere reduces pressure in the vapor space above the liquid and thereby reduces pressure in the vessel 12. This is a protective measure which assures the safety of the personnel and equipment.

The line 45 delivers liquid cryogenic fuel to a heat exchanger which functions as a vaporizer 54. For convenience, a pressure gauge 55 is connected at the inlet side of the vaporizer. The vaporizer includes several tubes which are equipped on the exterior with fins for absorbing heat. As heat is absorbed, the liquid cryogenic fuel is converted into gas and must flow through an outlet line 56. The line 56 passes through a throttle valve 57 which is then connected to a reversing control valve 58. The control valve 58 is preferably manipulated by the user. The valve 58 is a direction control for the power plant. The valve 57 is a speed control valve. The valve 58 thus has an inlet line 59 connected to it, and also has a port 60 which is vented to atmosphere. The valve 58 thus delivers cryogenic fuel to the engine and vents the spent gases to atmosphere. The gas vented to atmosphere is non-polluting. The valve 58 reverses operation of the engine.

The valve 58 is connected to a line 61 which connects to a pressure transducer 62. The pressure sensor 62 senses the line pressure and adjusts the intake 40 location by providing a pressure related signal to an actuator 63 to move the valve 40. The sensor 62 measures line pressure to thereby vary the position of the intake valve 40, which alters the time of opening thereby conserving fuel.

The line 61 connects to a manifold 64 which is then input to each intake valve 40. The valve assembly 40 provides timed gas flow through two outlet lines, in effect, functioning as two valves. One outlet line is indicated by the numeral 66 and connects to one end of the cylinder 24. The other outlet 67 connects to the opposite end of the cylinder 24. This enables this piston to be driven from both ends. The exhaust or outlet valve 42 is connected to both ends of the cylinder 24 by the lines 68 and 69. For convenience sake, it is not necessary to form separate openings into the cylinder. In other words, only one opening is shown at the head of the cylinder and it is shared by both the inlet and exhaust valves. Since FIG. 7 is a schematic representation, it must be noted that the lines 68 and 66 can share a common opening at the lower end of the cylinder. This is a matter of convenience in the manufacture of the cylinder. The lower end of the cylinder is sealed around the piston rod 26 which extends from the cylinder to prevent leakage.

In FIG. 7, it will be observed that there are two cylinders and hence, two exhaust valves 42. The two exhaust valves connect to an exhaust manifold 70 which connects to a common line 71 to the valve 58 and through the exhaust port 60. With the valve 58 in the illustrated position, the apparatus is fueled to drive forwardly. If the valve 58 is reversed, the apparatus will drive in the reverse direction. In other words, the valves 42 then become intake valves. For reasons as will be noted; this is not the most efficient arrangement but it permits the apparatus to back up by powering the pistons for movement in reverse sequence of operation. Also, this eliminates a reverse gear transmission requirement.

With the foregoing sequence of operation in mind, attention is next directed to FIG. 5 of the drawings. In FIG. 5, the intake valve assembly 40 is shown. As will be understood, a valve control rod 38 extends into the body of the valve. The body of the valve incorporates a central fixed, hollow tubular member 71. It is concentric with an upper telescoped body member 72 and a lower telescoped body member 73. They are similar in function, each one incorporating an outlet opening to the opposite ends of the cylinder. The telescoping portion 72 thus includes a lateral port or opening 74, and a similar port 75 is shown in lower similar part. The telescoping tubular members 72 and 73 move toward or away from the central tubular member 71. When they move toward it, they increase the amount of gas flow. When they are moved away, they decrease the amount of flow of gas through the valve by decreasing the total time of opening of the dual valve mechanism. Their movement is symetrical because each one is an intake connected to a cylinder of equal volume.

Attention is momentarily directed to FIG. 2 of the drawings. In FIG. 2, a disc 77 is mounted on the inlet fitting 78 (FIG. 5) and is connected to push rods 79 and 80. The push rods are pin connected to the telescoping tubular portions 72 and 73 of the valve assembly 40. When the disc 77 is rotated, the telescoping portions are pushed apart, thereby decreasing the gas flow through the valve. The disc 77 is rotated by a flexible cable 81 which is connected to the protruding tab 82 affixed to the disc 77. The disc 77 serves as a lever arm for rotation about the center point of its mounting and adjusts the valve 40 accordingly. The flexible cable passes through an eyelet 82 appended to a transverse support 83. The transverse support 83 is additionally shown in FIGS. 1 and 4 where it is joined to a pair of protruding arms 84 which are pivotally mounted on the base plate 22. The end of the cable 81 is not shown, but it extends to a convenient location for the driver where he can hand manipulate the cable. This varies the rotational position of the disc 77, and through the levers 79 and 80, the opening of the valve mechanism is controlled. This enables the driver to "trim" the valving for the motor and thereby reduce fuel consumption. If the driver is not accelerating the vehicle, it is possible to trim back a little bit in a steady state situation to reduce the fuel consumption of the engine.

The transverse frame member 83 shown in FIG. 4 supports the intake manifold line 64. This line preferably connects to the fitting 78 shown in FIG. 5. The fitting 78 is duplicated on the opposite side of the valve. Thus, each valve 40 is connected with the line 64. The manifold line 64 is preferably made of hollow tubing which is rigid to thereby serve as a stiffener, holding each intake valve 40 in a common plane with the adjacent intake valves. Moreover, this enables the intake valves 40 and the transverse brace 83 to pivot on the arms 84 as an assembly. It will be observed that the arms 84 terminate at pivots supported on the base plate 22 which and they are aligned with the crank shaft 32. The entire assembly thus pivots, varying the angular location of the valves relative to the crank shaft. This varies the relative opening and closing times of the intake valves with respect to the top dead center position of the piston in the cylinder.

Returning now to FIG. 5 of the drawings, the push rod 38 is connected to a hollow cylindrical valve element 86. It incorporates an elongate window 87 at several locations in the middle portion, the window 87 introducing gas flow from the manifold 64 and fitting 78. To assure distribution of the gas, the tubular valve body 71 had an internal groove 88 adjacent to the opening 78 to distribute gas flow fully around the reciprocating member 86. The groove 88 spans three or four (the preferred number) of the lengthwise windows 87. The ports 87 are formed along the length of the reciprocating member and have an extent such that they always span the groove 88 and thereby continuously introduce gas flow into the internal chamber. The valve element 86 is a reservoir which assures that there is no drop of pressure at the cylinder when the valve operates.

The numeral 89 identifies a set of ports at the lower end of the reciprocating hollow valve element 86. Three or four ports (more if needed) are arranged at the same relative elevation in the valve element and are spaced around the periphery. They communicate with a groove 90 formed on the exterior of the valve element. When the groove 90 is adjacent to the outlet port 75, pressurized gas is delivered through the port 75 for operation of the engine. As depicted in FIG. 5, a similar port 91 is found at the upper end and it has a similar groove 92 which is adjacent to the port 74. Thus, gas is delivered through the upper port 74 and none is delivered at that time through the lower port 75. The external grooves 90 and 92 in the reciprocating valve element are preferably isolated by O-rings. The O-rings prevent blow by and waste of fuel.

As described to this juncture, the inlet valve 40 thus delivers alternate pulsations of gas through the ports 74 and 75. There is an interval at which no gas flow is delivered. This is particularly advantageous in that the gas flow is delivered at full pressure when the piston is at top dead center. As it moves towards the other end near the end of its stroke, no additional fuel is supplied in the last part of the stroke. By the end of the stroke, the gas in the cylinder 24 is substantially near atmospheric pressure. In other words, no gas is wasted by late introduction into the cylinder where it is vented to atmosphere wastefully.

In FIG. 6 of the drawings, the exhaust valve 42 is shown. It too is provided with a push rod which for descriptive purposes will be identified by the numeral 93. The push rod 93 is connected to a valve element 94 arranged in a hollow cylindrical body 95. The body 95 is provided with inlet ports 96 and 97. They are respectively connected to the upper and lower ends of the associated cylinder. Exhaust gas is flowed into two ports 96 or 97 in alternated sequence. Each port 96 and 97 is positioned adjacent to an internal groove 98 formed in the tubular body 95.

The push rod 93 reciprocates the valve element 94. It is axially drilled at 99 to define an exhaust passage. A first set of lateral ports 100 is formed connected with the axial passage 99, and a similar and second set 101 is shown in FIG. 6.

The exhaust valve 42 as illustrated in FIG. 6 of the drawings shows the valve element 94 positioned for exhausting the port 97 to atmosphere. The port 96 is closed to atmosphere. The valve element 94 reciprocates to alternately reverse the opening of the ports 96 and 97.

Operation of the cryogenic power plant disclosed will next be considered. The tank 12 is filled from some suitable source. The regulator valve 49 controls the pressure in the tank to thereby force liquid cryogenic feed through the line 45. In the vaporizor 54, the liquid is boiled to a gaseous state and thereby expands. As it expands, the pressure is measurably increased. This creates a high pressure flow of gas through the valves and conduits to the intake valves 40. Assuming that the apparatus incorporates two cylinders, two intake valve assemblies 40 are normally used. The intake valves function in a similar fashion, and their difference in operation is a result of the timed sequence controlled by the lobes on the crank shaft 32. Considering the intake valve operation, high pressure gas is delivered through the inlet lines 66 and 67 as alternate pulses. The pulses are timed to the relative position of the piston 25. When the piston is at the top dead center the line 67 delivers a short pulse of pressurized gas. This drives the piston towards the lower end of the cylinder 24. When the piston is at the bottom dead center position, the line 66 delivers a flow of gas which forces the piston back toward the top end. As will be understood, the exhaust valve assembly 42 is synchronized in its operation to open the lines 68 and 69 to exhaust one side of the cylinder and then the other side. The exhaust gas is vented through the exhaust manifold 70, the line 71 and the directional valve 58 to atmosphere.

Figure 3:
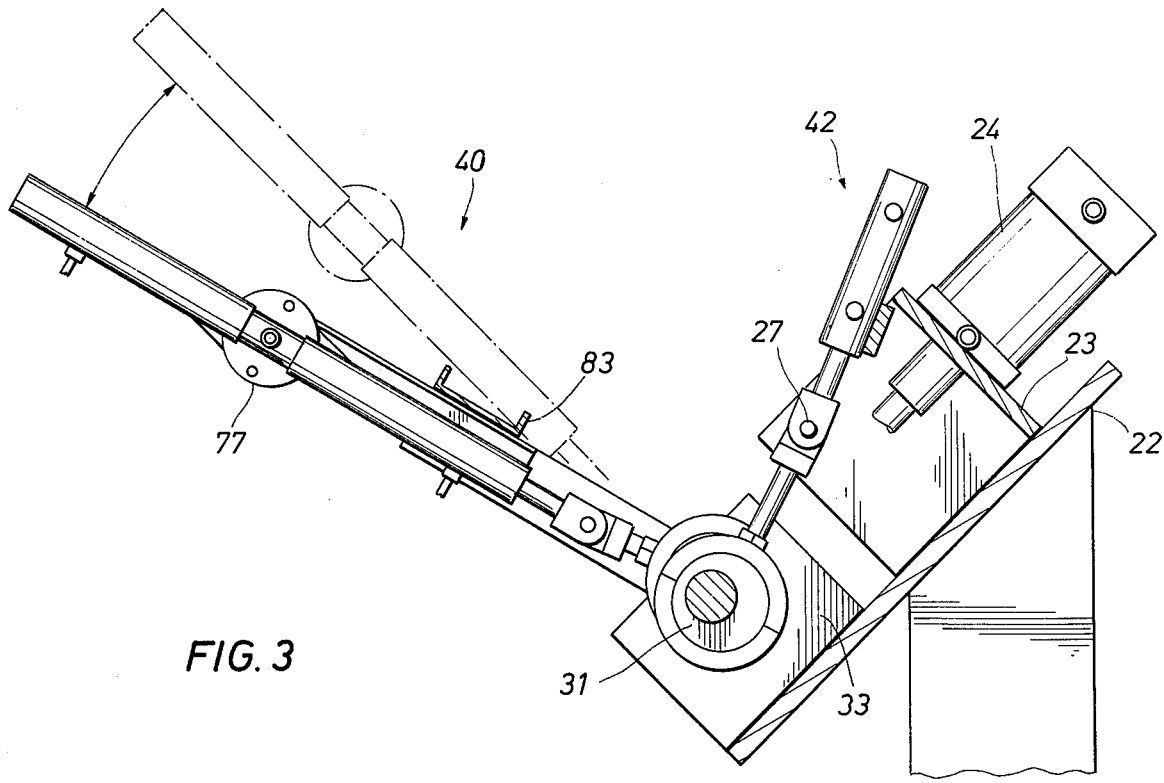
FIG. 3 is a view similar to FIG. 2 showing the same apparatus after the inlet valve is rotated through a specified angle.

Attention is next directed to the comparison of FIGS. 2 and 3. It will be observed there that the exhaust valve 42 is mounted at a fixed angular position relative to the crank shaft 32. The cylinder and piston rod are also fixedly mounted relative to the base plate 22. The intake valve 40 is mounted at a selected and adjustable angle in FIG. 2. This angle can be varied by moving the entire intake valve assembly. The valve assembly is rotatable through a specified range of angular locations. This varies the position of the cam followers for the intake valve assembly. This varies the position of the cam follower while the cam lobe integrally constructed in the crank shaft 32 maintains its relative fixed position using the cylinder and piston rod as a reference point. Movement of the intake valve assembly causes the valve to open sooner in each cycle or the opening is delayed depending on the rotation of the assembly. The dotted line position of FIG. 3 illustrates this. When the assembly is rotated to the dotted line position, the intake valve is opened later in each cycle of operation in comparison with the full line position.

Adjustments in the angular position of the intake valve assembly as shown in FIGS. 2 and 3 does not need to be changed often. It is an adjustment made to accommodate a change in pressure. As might occur in slowing the vehicle or exhausting the supply tank.

One particular advantage of this power source is that it has a wide speed range. It is a relatively low speed engine which furnishes torque even at a stand still. The engine speed ranges from a stalled condition (zero RPM) to several hundred RPM. In contrast to an internal combustion engine, there are not elevated temperatures in the equipment. In fact, the temperatures of the equipment are lowered as a cryogenic gas flows through the equipment. The gas exhausted by the equipment is non-polluting and hence, pollution prevention equipment is not required in the exhaust system. In addition, the device runs relatively quietly.

It will be observed that the power plant has been depicted in an exposed framework. If desired, the crank shaft, piston rods, and connecting rods can be enclosed and submerged in an oil bath. This will be very helpful for lubrication at sustained high speed operation. An oil bath is not required and is optional at the contemplated engine speeds. The type of oils used, i.e., synthetic oils, etc., is also optional.

The engine herein disclosed is timed in a rather straight forward manner. A timing chart is found below for two different pressures for an exemplary engine. The lower pressure requires a longer interval (measured by degrees of rotation of the crankshaft) to fill the cylinder. As an example, about 30° rotation at 250 psi fills the cylinder to yield a stroke while about 35° rotation is needed for 200 psi. A lower pressure requires a longer opening.

TABLE I

| 1st Head End Cylinder Crank Angle plus degrees from T.D.C. | 1st Cylinder Head End | 1st Cylinder Crank End | 2nd Cylinder Head End | 2nd Cylinder Crank End |
|---|---|---|---|---|
| \multicolumn{5}{c}{250 psi Pressure to Intake Valves} | | | | |
| 0° | Intake opens | Exhaust opens | Exhaust open | Intake closed |
| 30° | Intake closes | | | |
| 60° | | | Exhaust closes | |
| 90° | | | Intake opens | Exhaust opens |
| 120° | | | Intake closes | |
| 150° | | Exhaust closes | | |
| 180° | Exhaust opens | Intake opens | | |
| 210° | | Intake closes | | |
| 240° | | | | Exhaust closes |
| 270° | | | Exhaust opens | Intake opens |
| 300° | | | | Intake closes |
| 330° | Exhaust closes | | | |
| 360° | | Exhaust opens | | |
| \multicolumn{5}{c}{200 psi Line Pressure to Intake Valves} | | | | |
| 0° | Intake opens | Exhaust opens | Exhaust open | Intake closed |
| 30° | | | | |
| 35° | Intake closes | | | |
| 60° | | | Exhaust closes | |
| 90° | | | Intake opens | Exhaust opens |

TABLE I-continued

| | | | | |
|---|---|---|---|---|
| 120° | | | | |
| 125° | | | Intake closes | |
| 150° | | Exhaust closes | | |
| 180° | Exhaust opens | Intake opens | | |
| 210° | | | | |
| 215° | | Intake closes | | |
| 240° | | | | Exhaust closes |
| 270° | | | Exhaust opens | Intake opens |
| 300° | | | | |
| 305° | | | | Intake closes |
| 330° | Exhaust closes | | | |
| 360° | | Exhaust opens | | |

The lift on the cam (its eccentricity) is related to the valve cross sectional flow area, pressure, and engine speed. The cams are identical to one another for multi-cylinder engines. Indeed, one intake and one exhaust cam can be used for an engine of N cylinders as cam followers are spaced at intervals of 360°/N around the cams, where N is a whole integer.

The adjustment in angular position of the intake valve assembly is achieved by the actuator 63 shown mechanically connected to the valve assemble 40 in FIG. 7. When the operator decreases speed by reducing fuel flow (by altering the flow through the throttle valve 57), the actuator 63 moves the intake valve assemble 42 to better utilize the reduced fuel flow. The valve assembly movement is not contrary to the operator's control of engine speed; rather, it yields expedient fuel usage.

The table shows that gas introduction into the cylinder only occurs for a fraction of a power stroke. The rest of the power stroke enables gas expansion (and hence a pressure drop) until the pressure at the end of the stroke is low at which time the exhaust valve opens. The piston then begins its exhaust stroke and voids the cylinder for a longer interval (measured in degrees of rotation). Back pressure on the exhaust stroke is thus low, utilizing practically all the energy in each pulsation of fuel delivered to the engine. It must be kept in mind that the power stroke of the piston 25 for one end of the cylinder 24 is the exhaust stroke for the opposite end of the cylinder. This produces more power, smoother operation, and a more compact power plant.

Fortunately, valving as illustrated with timing as exemplified causes the engine to rotate in the same direction each time it is switched on without regard to the rest position of the valves or piston. The only way to obtain reverse rotation is to supply the fuel through the exhaust valve by operating the reversing valve 58. The exhaust valves 42 can function as intake valves; this does not however provide the optimum in effeciency because the exhaust valves are open substantially longer then the intake valves, and when reversed, provide less efficient operation.

The foregoing is directed to the preferred embodiment but the scope thereof is determined by the claims which follow.

We claim:

1. A vehicular power source, comprising;
   an engine operable by expanding gases which imparts rotation to an output shaft;
   a cryogenic liquid storage container means for receiving and storing a specified quantity of a cryogenic liquid therein;
   a feed line extending from said storage means for removing cryogenic liquid therefrom, said line connecting to said engine;
   means for adding heat to the cryogenic liquid removed from said container means by said line sufficient in amount to boil the cryogenic liquid and thereby create a flow of gas for pressurizing the engine to cause it to operate;
   valve means for controlling the rate of flow of gas to said engine;
   a vapor space above a liquid storage space in said storage means;
   means for removing and vaporizing a portion of the liquid therein; and
   means for returning at least a portion of the vaporized liquid to the vapor space to pressurize the liquid in said storage means to force liquid from said storage means into said feed line.

2. The apparatus of claim 1 wherein said feed line exits said storage means at a point submerged in the liquid in said storage means.

3. The apparatus of claim 1 wherein said heat adding means includes a vaporizor connected serially in said feed line.

4. The apparatus of claim 3 wherein said feed line extends from said vaporizor to a first and second valve means serially connected in said feed line; one of said valve means throttling the flow of gas to said engine, and the other of said valve means connecting to said engine via two inlets which engine is constructed and arranged to rotate said output shaft in opposite directions dependent on which of said inlets is provided with the gas flow by said other valve means.

5. The apparatus of claim 1 wherein said engine includes at least one cylinder with a piston therein and a connecting rod connected to said piston and said output shaft to rotate it on operation of said engine.

6. The apparatus of claim 5 including an intake valve connected to said feed line and to said cylinder, said intake valve including an opening and closing valve element which reciprocates to pulsate the flow of gas to said engine.

7. The apparatus of claim 6 wherein said cylinder is double acting by providing at opposite ends thereof an intake port, and said intake valve is connected to both intake ports; said intake valve including a pair of outlets which are alternately pulsated with gas flow controlled by said valve element.

8. The apparatus of claim 7 wherein said intake valve includes a pressurized chamber continuously connected to said feed line to come up to line pressure, and said valve element alternately communicates said pressurized chamber to said two ports thereof.

9. The apparatus of claim 7 wherein said intake valve includes the pair of ports arranged at opposite ends of an elongate cylindrical apparatus, and said valve element reciprocates therein to alternately close said ports; said valve element sealingly closing said ports on movement in response to a valve element control rod connected at one end to a cam rotated synchronously with rotation of said output shaft, said valve element further including ports which periodically communicate with the ports in said elongate cylindrical body.

10. The apparatus of claim 9 including means for movably mounting said intake valve at a specified angle relative to said cam; said intake valve, cam, and control rod cooperating to vary the time of opening and closing of said intake valve relative to the angular position of said cam.

11. The apparatus of claim 10 including a pressure responsive actuator means for moving said intake valve between selected angular positions in response to the pressure in said feed line supplied to said engine to increase the relative angular opening of said intake valve at slower engine speeds.

12. The apparatus of claim 1
wherein said storage means further comprises an insulated storage container; and
a relief line connected into the vapor space of said storage means which line is connected to a pressure relief valve means which establishes an upper limit to pressure in said storage means.

13. The apparatus of claim 1 including a valve in said feed line having four ports, one port of which is connected to said feed line, one port being vented to exhaust, and the remaining two ports connected to an inlet and an outlet of said engine for alternately supplying to said engine reversed gas flow on operation of said valve.

14. The apparatus of claim 1 including a wheeled vehicle powered by said engine output shaft; and also including a seat for a person thereon.

15. The apparatus of claim 14 including a steerable wheel on said vehicle for controlling the direction of movement of said vehicle; and wherein said engine is constructed and arranged to provide torque at zero engine speed enabling said engine to be connected directly to a driving wheel on said vehicle.

* * * * *